US011681102B2

(12) United States Patent
Carlson et al.

(10) Patent No.: US 11,681,102 B2
(45) Date of Patent: Jun. 20, 2023

(54) LAMINATE SPLICE PROTECTOR

(71) Applicant: COMMSCOPE TECHNOLOGIES LLC, Hickory, NC (US)

(72) Inventors: Scott L. Carlson, Bloomington, MN (US); Jaime Gonzalez Batista, Shakopee, MN (US); Yu Lu, Eden Prairie, MN (US); Mandy Lea Trnka, Lonsdale, MN (US); Kenneth Allen Skluzacek, Belle Plaine, MN (US); Cyle D. Petersen, Belle Plaine, MN (US); Burton J. Hedstrom, St. Paul, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/278,165

(22) PCT Filed: Sep. 20, 2019

(86) PCT No.: PCT/US2019/052154
§ 371 (c)(1),
(2) Date: Mar. 19, 2021

(87) PCT Pub. No.: WO2020/061452
PCT Pub. Date: Mar. 26, 2020

(65) Prior Publication Data
US 2021/0349263 A1     Nov. 11, 2021

Related U.S. Application Data

(60) Provisional application No. 62/898,742, filed on Sep. 11, 2019, provisional application No. 62/879,573, (Continued)

(51) Int. Cl.
*G02B 6/25* (2006.01)
*G02B 6/255* (2006.01)

(52) U.S. Cl.
CPC ................... *G02B 6/2558* (2013.01)

(58) Field of Classification Search
CPC .............. G02B 6/2558; G02B 6/255
(Continued)

(56) References Cited

U.S. PATENT DOCUMENTS

| 4,744,631 A | 5/1988 | Eichenbaum et al. |
| 4,900,126 A | 2/1990 | Jackson et al. |

(Continued)

FOREIGN PATENT DOCUMENTS

| DE | 196 49 007 A1 | 5/1998 |
| EP | 0 257 841 A2 | 3/1988 |

(Continued)

OTHER PUBLICATIONS

International Search Report and Written Opinion of the International Searching Authority for International Patent Application No. PCT/US2019/052154 dated Jan. 10, 2020, 15 pages.

(Continued)

*Primary Examiner* — Jerry M Blevins
(74) *Attorney, Agent, or Firm* — Merchant & Gould P.C.

(57) ABSTRACT

Certain splice arrangements include first and second laminate structures bonded around a splice location at which two or more optical fibers are spliced (e.g., fusion spliced) together. The first and second laminate structures each include a flexible polymeric sheet and a heat activated adhesive layer carried by the flexible polymeric sheet. Other splice arrangements include a protective barrier disposed about an optical splice. The protective barrier includes first and second protective layers bonded around the optical splice. Each protective layer include a film carrying an adhesive. The protective barrier may be sufficiently flexible to not restrict flexing the optical fibers at the splice location. Example splice arrangements have thicknesses of less than (Continued)

or equal to 1000 microns, or 900 microns, or 800 microns, or 700 microns, or 600 microns or 500 microns.

17 Claims, 8 Drawing Sheets

Related U.S. Application Data filed on Jul. 29, 2019, provisional application No. 62/836,294, filed on Apr. 19, 2019, provisional application No. 62/734,110, filed on Sep. 20, 2018.

(58) Field of Classification Search
USPC .......................................................... 385/96
See application file for complete search history.

(56) References Cited

U.S. PATENT DOCUMENTS

| | | | |
|---|---|---|---|
| 4,980,007 A | 12/1990 | Ferguson | |
| 5,076,881 A | 12/1991 | Ferguson | |
| 5,731,051 A | 3/1998 | Fahey et al. | |
| 5,963,699 A * | 10/1999 | Tanaka | G02B 6/3806 385/83 |
| 6,295,400 B1 | 9/2001 | Shahid | |
| 6,621,973 B1 * | 9/2003 | Hoffman | G02B 6/0096 385/125 |
| 8,702,326 B2 | 4/2014 | Faulkner et al. | |
| 8,992,098 B2 | 3/2015 | Anderson et al. | |
| 9,360,624 B2 | 6/2016 | Faulkner et al. | |
| 9,939,599 B2 | 4/2018 | Blazer et al. | |
| 10,012,805 B2 | 7/2018 | Anderson et al. | |
| RE48,144 E | 8/2020 | Faulkner et al. | |
| 11,474,295 B2 | 10/2022 | Beri et al. | |
| 2005/0271342 A1 | 12/2005 | Tankaka et al. | |
| 2013/0223803 A1 * | 8/2013 | Yamaguchi | C09D 175/16 522/18 |
| 2013/0251317 A1 * | 9/2013 | Faulkner | G02B 6/2556 385/96 |
| 2014/0112631 A1 | 4/2014 | Namazue et al. | |
| 2015/0160415 A1 | 6/2015 | Lloyd et al. | |
| 2017/0031121 A1 | 2/2017 | Blazer et al. | |
| 2017/0235068 A1 | 8/2017 | Debban et al. | |

FOREIGN PATENT DOCUMENTS

| | | |
|---|---|---|
| GB | 2 060 196 A | 4/1981 |
| JP | S58-158621 A | 9/1983 |
| JP | S62-180306 A | 8/1987 |
| WO | 2016/086881 A1 | 6/2016 |
| WO | 2017/127133 A1 | 7/2017 |
| WO | WO-2017127133 A1 * | 7/2017 ........... G02B 6/2558 |

OTHER PUBLICATIONS

Extended European Search Report for European Patent Application No. 19862089.0 dated Apr. 8, 2022, 10 pages.

* cited by examiner

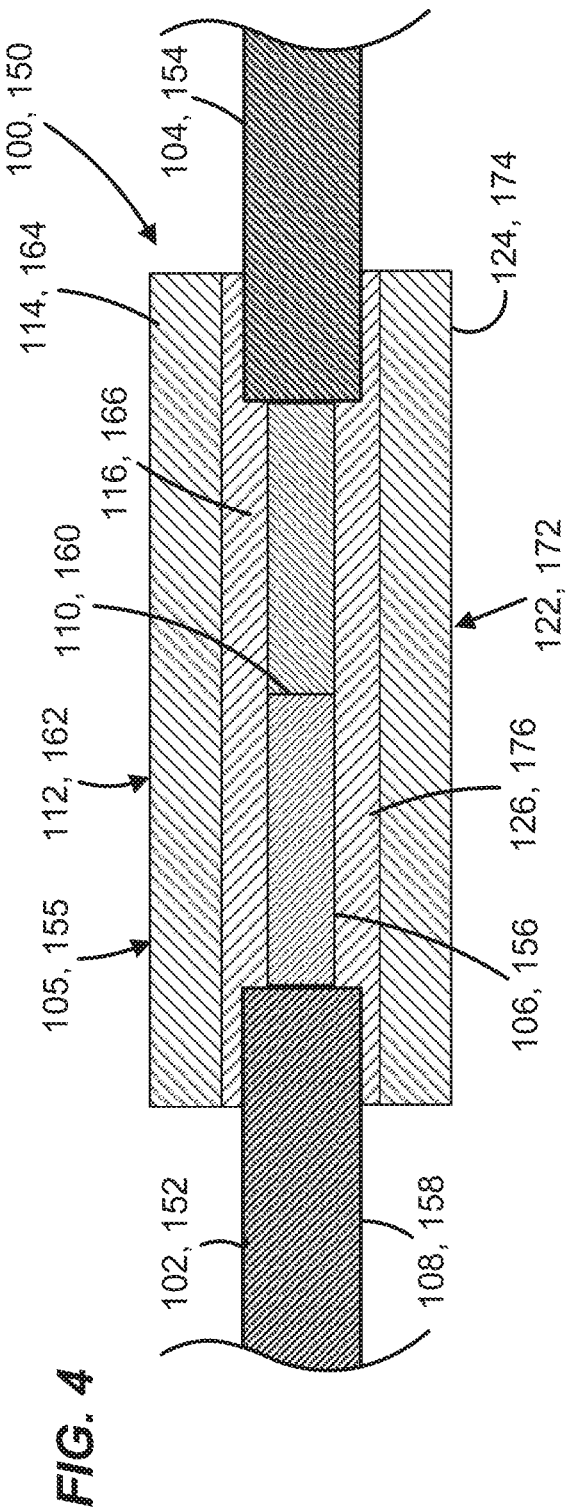
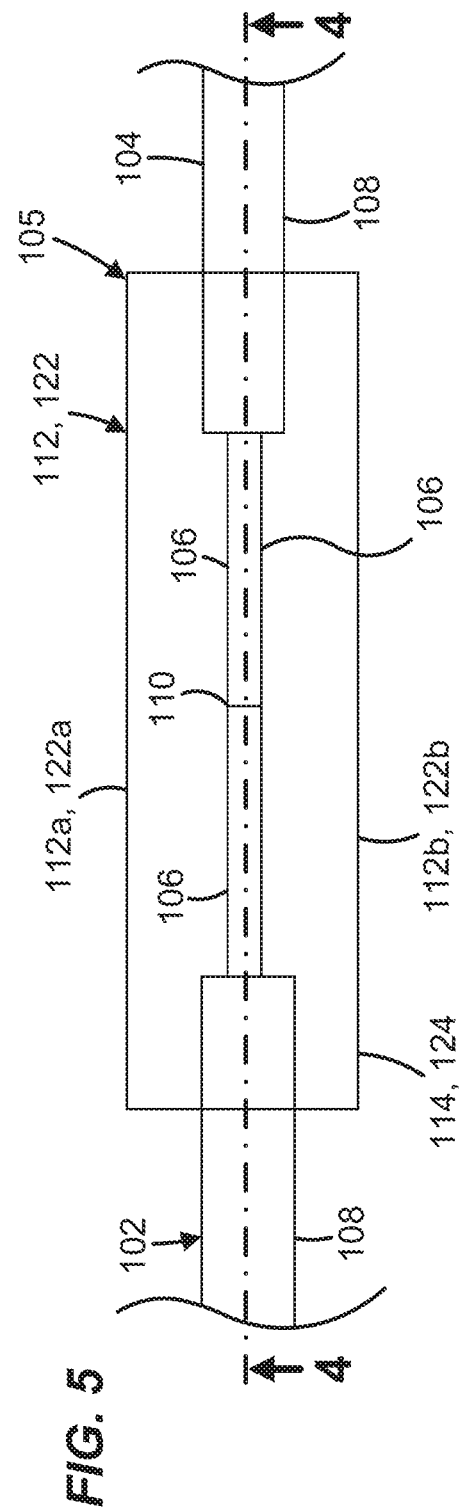
FIG. 4
FIG. 5

LAMINATE SPLICE PROTECTOR

CROSS-REFERENCE TO RELATED APPLICATIONS

This application is a National Stage Application of PCT/US2019/052154, filed on Sep. 20, 2019, which claims the benefit of U.S. Patent Application Ser. No. 62/734,110, filed on Sep. 20, 2018, and claims the benefit of U.S. Patent Application Ser. No. 62/836,294, filed on Apr. 19, 2019, and claims the benefit of U.S. Patent Application Ser. No. 62/879,573, filed on Jul. 29, 2019, and claims the benefit of U.S. Patent Application Ser. No. 62/898,742, filed on Sep. 11, 2019, the disclosures of which are incorporated herein by reference in their entireties. To the extent appropriate, a claim of priority is made to each of the above disclosed applications.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber splices are an important part of most fiber optic communication systems. Optical fiber splices are typically used to provide a permanent or near permanent optical connection between optical fibers. Optical splices can include single fiber splices and multi-fiber splices (e.g., mass fusion splices). In a common splicing operation, two optical fibers or two sets of optical fibers are first co-axially aligned. Often opto-electronic equipment is used to provide active alignment of the cores of the optical fibers. Once the optical fibers have been aligned, the ends of the optical fibers can be fusion spliced together usually by an electric arc. After splicing, the splice location is typically reinforced with a fiber optic fusion splice protector. A common type of fiber optic fusion splice protector is a SMOUV fiber optic fusion splice protector sold by CommScope Inc. of Hickory, N.C., USA. This type of fusion splice protector includes an outer shrink-fit tube, a low temperature hot melt adhesive and a stainless steel or ceramic rod which functions to add rigidity to the protector and to reinforce the splice location.

SUMMARY

Certain aspects of the disclosure are directed to a splice arrangement including first and second laminate structures positioned around a splice location at which two or more optical fibers are spliced (e.g., fusion spliced) together. The first and second laminate structures each include a polymeric sheet and an adhesive layer carried by the polymeric sheet. The adhesive layer bonds to the spliced fibers to sandwich the fibers between the polymeric sheets.

In certain implementations, the adhesive layer may include multiple layers of adhesive. For example, the adhesive layer may include a layer of soft adhesive against a layer of hard adhesive.

Certain aspects of the disclosure are directed to a splice arrangement including first and second laminate structures positioned around a splice location at which two or more optical fibers are spliced (e.g., fusion spliced) together. The first and second laminate structures each include a flexible polymeric sheet and a heat activated adhesive layer carried by the flexible polymeric sheet. The sheets can be bonded together (e.g., via the adhesive).

Certain aspects of the disclosure are directed to a splice arrangement including first and second films positioned across a splice location at which two or more optical fibers are spliced (e.g., fusion spliced) together. The first and second films each carry an adhesive that bonds to the optical fibers and/or to coating on the optical fibers to form a protective barrier around the splice location.

In examples, each film includes a flexible polymeric sheet. In an example, the flexible polymeric sheet includes polyester plastic.

In certain implementations, no chemicals are needed to activate the adhesive. In some examples, the adhesive is heat activated. In other examples, the adhesive is pressure activated. In still other examples, the adhesive is UV curable to activate the adhesive. In other implementations, the adhesive is chemically activated.

In some implementations, a single optical fiber is spliced to another single optical fiber at the splice location. In other implementations, a plurality of optical fibers are spliced to another plurality of optical fibers at the splice location. In some examples, the optical fibers of each plurality are loose relative to each other. In other examples, the optical fibers of each plurality are loosely ribbonized relative to each other. In still other examples, the optical fibers of each plurality are fully ribbonized relative to each other.

In certain implementations, the protective barrier may have a thickness of no more than 0.2 inches greater than a thickness of the spliced fibers. In certain implementations, the protective barrier may have a thickness of no more than 0.15 inches greater than a thickness of the spliced fibers. In certain implementations, the protective barrier may have a thickness of no more than 0.1 inches greater than a thickness of the spliced fibers. In certain implementations, the protective barrier may have a thickness of no more than 0.05 inches greater than a thickness of the spliced fibers. In certain implementations, the protective barrier may have a thickness of no more than 0.04 inches greater than a thickness of the spliced fibers. In certain implementations, the protective barrier may have a thickness of no more than 0.03 inches greater than a thickness of the spliced fibers. In certain implementations, the protective barrier may have a thickness of no more than 0.02 inches greater than a thickness of the spliced fibers. In certain implementations, the protective barrier may have a thickness of no more than 0.01 inches greater than a thickness of the spliced fibers.

In certain implementations, the films each have a thickness of no more than 0.03 inches. In certain implementations, the films each have a thickness of no more than 0.02 inches. In certain implementations, the films each have a thickness of no more than 0.01 inches. In certain implementations, the films each have a thickness of no more than 0.006 inches. In certain implementations, the films each have a thickness of no more than 0.003 inches.

In certain implementations, the protective barrier has a flexibility on par with a flexibility of the optical fibers being spliced. In certain implementations, the protective barrier is sufficiently flexible to not noticeably diminish a flexibility of the optical fibers at the splice location. In certain implementations, the protective barrier does not restrict the flexibility of the optical fibers at the splice location.

In certain implementations, the protective barrier adds rigidity or stiffness to the cable arrangement at the location of the splice. For example, the protective barrier may be no more than 50% as flexible as the cable arrangement. In certain examples, the protective barrier may less than 55% as flexible as the cable arrangement. In certain examples, the protective barrier may less than 60% as flexible as the cable arrangement. In certain examples, the protective barrier may less than 45% as flexible as the cable arrangement. In certain examples, the protective barrier may between about 1% as flexible as the cable arrangement and 55% as flexible as the cable arrangement. In certain examples, the protective barrier may between about 10% as flexible as the cable arrangement and 50% as flexible as the cable arrangement. In certain examples, the protective barrier may between about 10% as flexible as the cable arrangement and 40% as flexible as the cable arrangement. In certain examples, the protective barrier may between about 20% as flexible as the cable arrangement and 55% as flexible as the cable arrangement. In certain examples, the protective barrier may between about 1% as flexible as the cable arrangement and 20% as flexible as the cable arrangement.

The protective barrier may be installed at a factory during factory splicing operations or in the field during field splicing operations. In various examples, the splice location and protective barrier may be located within a cable (e.g., within a cable jacket), within a connector (e.g., a plug connector), adjacent and external to a connector, within a module (e.g., a splice tray, a termination module, etc.), within an overmold, within a rigid body (e.g., a protective housing) containing just the protective barrier, or within an enclosure (e.g., a terminal) containing other components in addition to the protective barrier.

In certain implementations, the protective barrier can have a flexible configuration by varying the film composition and/or the film thickness. Accordingly, each protective barrier can be customized to match a particular application (e.g., protecting a splice on a rigid tray, protecting a splice within a sealed closure, protecting a splice along a flexible cable, etc.).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 4 is a schematic, cross-sectional view of an example protective barrier mounted over an optical splice in accordance with principles of the present disclosure;

FIG. 5 is a schematic top plan view of the protective barrier of FIG. 4 over an example splice between first and second optical fibers in accordance with some principles of the present disclosure, the protective barrier being shown as clear for ease in viewing the splice;

FIGS. 8A and 8B illustrates different protective barrier configurations suitable for use with either of the cable arrangements of FIGS. 6 and 7;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
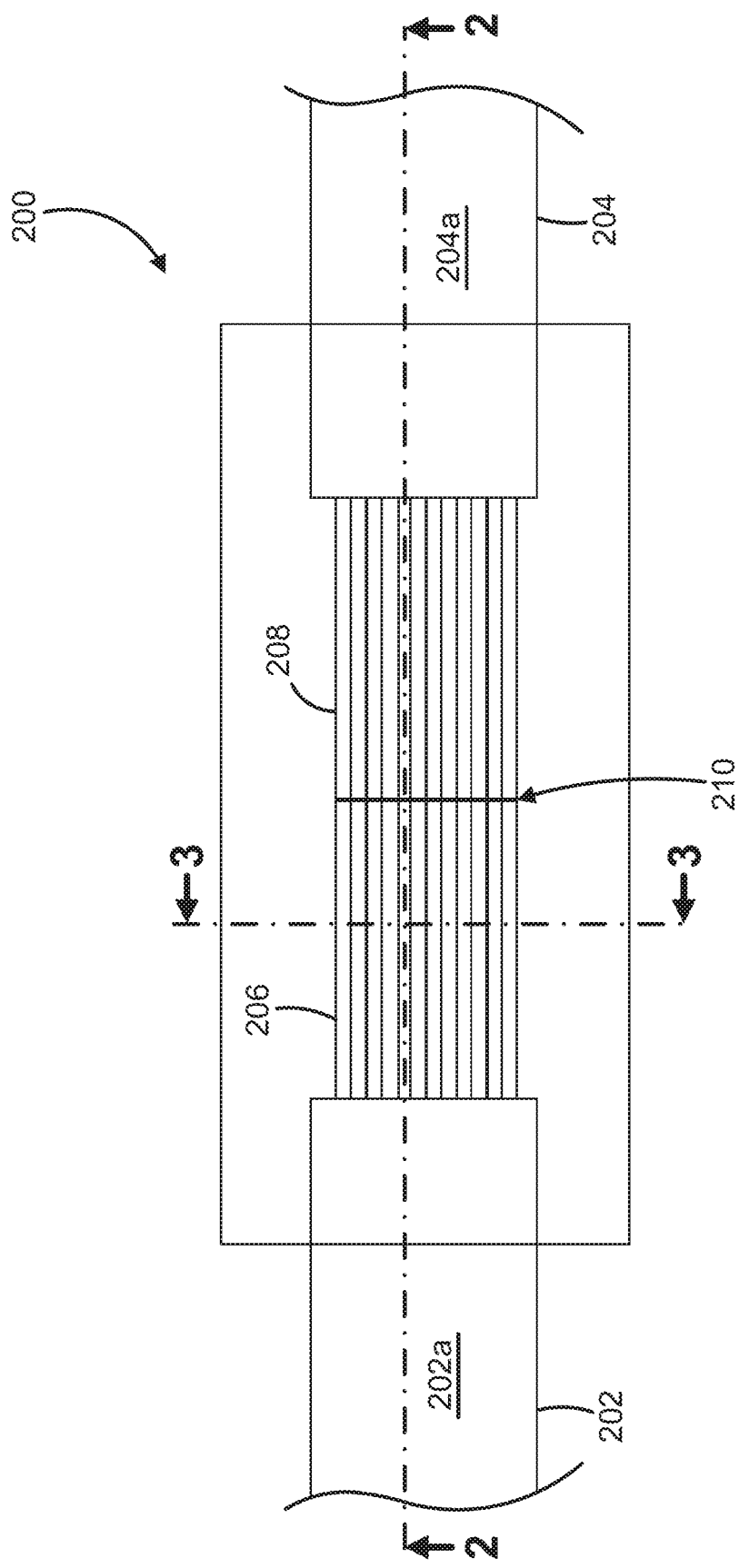
FIG. 1 is a top plan view of an example cable arrangement including a first ribbonized cable section spliced to a second ribbonized cable section at a splice location, the splice location being protected by a Mylar substrate arrangement.
Figure 2:
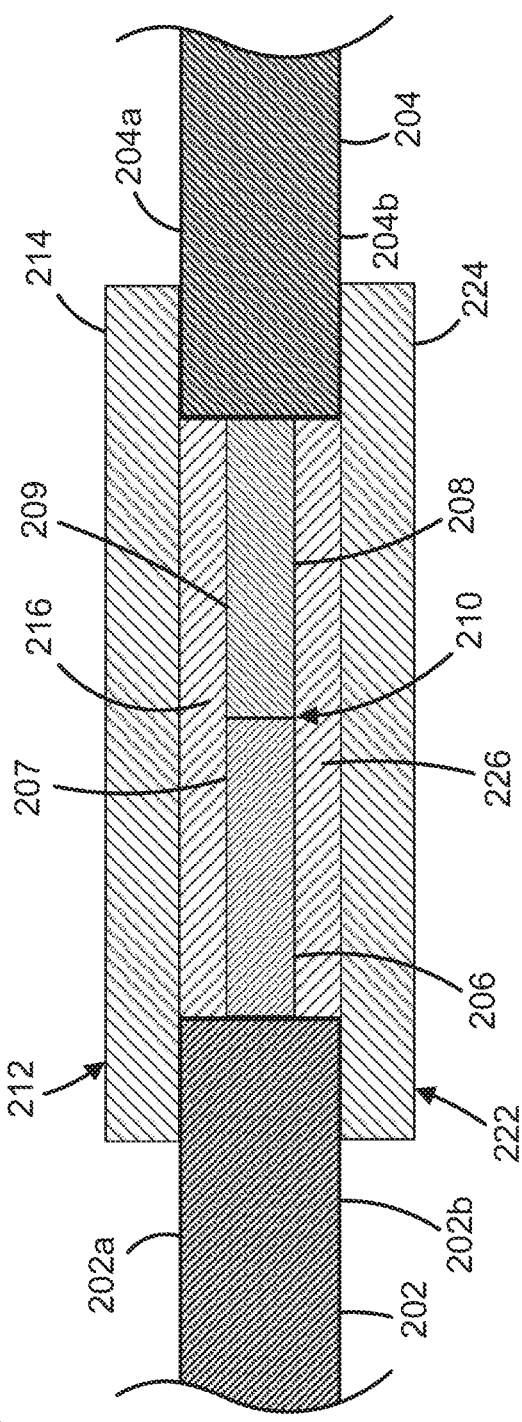
FIG. 2 is a transverse cross-section taken along the 2-2 line of FIG. 1.
Figure 3:
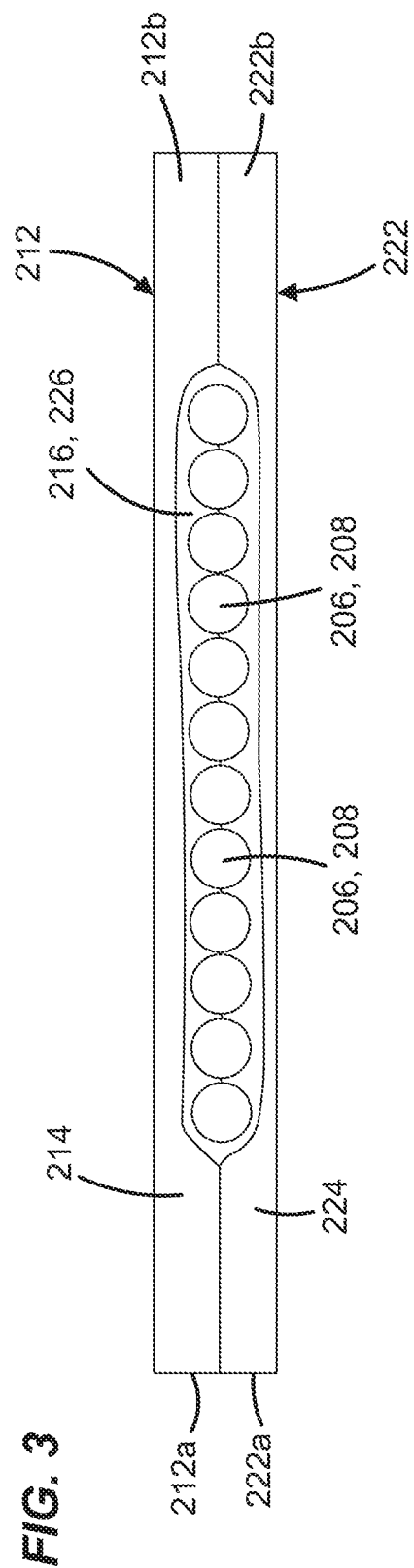
FIG. 3 is a transverse cross-section taken along the 3-3 line of FIG. 1 with the cross-hatching omitted for ease in viewing.

Referring to FIGS. 1-3, in accordance with some aspects of the disclosure, the present disclosure is directed to a splice arrangement 200 including first and second fiber ribbons 202, 204 including rows of optical fibers 206, 208 that are fusion spliced together at a splice location 210. The first and second fiber ribbons 202, 204 each have opposite first and second major sides 202a, 202b, 204a, 204b. The splice location is positioned between first and second laminate structures 212, 222. The first and second laminate structures 212, 222 each include a flexible polymeric sheet or film 214, 224 and a heat activated adhesive layer 216, 226 carried by the flexible polymeric sheet 214, 224. The adhesive layer 216 of the first laminate structure 212 is bonded to the first major sides 202a, 204a of the first and second fiber ribbons 202, 204 and the adhesive layer 226 of the second laminate structure 222 bonded to the second major sides 202b, 204b of the first and second fiber ribbons 202, 204.

In certain implementations, the optical fibers 206, 208 include bare fiber portions 207, 209 adjacent the splice location 210. The first and second laminate structures 212, 222 are adhesively bonded to the bare fiber portions 207, 209.

In certain examples, the first and second fiber ribbons 202, 204 include ribbonized portions where the optical fibers 206, 208 are coated with a matrix material. The first and second laminate structures 212, 222 are adhesively bonded to the ribbonized portions.

In certain implementations, the first and second laminate structures 212, 222 do not include any reinforcing rods.

In certain implementations, the splice arrangement 200 does not include any reinforcing rods that extend across the splice location 210.

In certain implementations, the flexible polymeric sheets 214, 224 each have a thickness in the range of 0.003 to 0.02 inches.

In certain implementations, the flexible polymeric sheets 214, 224 each have a thickness less than or equal to 0.02 inches, or less than or equal to 0.01 inches, or less than or equal to 0.005 inches.

In certain implementations, the first and second laminate structures 212, 222 are wider than the first and second fiber ribbons 202, 204. The first and second laminate structures 212, 222 are adhesively bonded to each other at longitudinal edges 212a, 222a, 212b, 222b that are positioned along outer longitudinal edges of the first and second fiber ribbons 202, 204.

In certain implementations, each optical fiber 206, 208 includes a core and a cladding layer surrounding the core.

In certain implementations, the first and second laminate structures 212, 222 are approximately as flexible as the fiber ribbons 202, 204.

In certain implementations, the first and second laminate structures 212, 222 have a first flexibility. The first and second fiber ribbons 202, 204 have ribbonized portions with a second flexibility. The first and second flexibilities do not vary by more than 25 percent.

In certain implementations, the splice location 210 can be located within a connector body of a fiber optic connector.

In certain implementations, the heat activated adhesive 216, 226 can be activated in an oven.

In certain implementations, the flexible polymeric sheets 214, 224 include mylar.

In certain implementations, the splice arrangement 200 can be used in panels, devices, modules, cable assemblies, break-outs and cable transitions.

In certain implementations, no chemicals are needed to activate the adhesive, 216, 226.

In certain implementations, the splice arrangement 200 has a thickness less than or equal to 2000 microns, or 900 microns, or 800 microns, or 700 microns, or 600 microns or 500 microns.

In accordance with other aspects of the disclosure, the splice arrangement 200 includes optical fibers 206, 208 that are fusion spliced together at a splice location 210; and first and second laminate structures 212, 222 each including a flexible polymeric sheet 214, 224 and a heat activated adhesive layer 216, 226 carried by the flexible polymeric sheet 214, 224. The splice location 210 is positioned and bonded between the first and second laminate structures 212, 222.

Referring to FIGS. 4-7, in accordance with other aspects of the disclosure, the present disclosure is directed to a splice arrangement 100, 150 including a protective barrier 105, 155 disposed over an optical splice 110, 160 between at least a first optical fiber 102, 152 and a second optical fiber 104, 154 at a splice location. The protective barrier 105, 155 includes a first protective layer 112, 162 and a separate, second protective layer 122, 172 that cooperate with each other to sandwich the optical splice 110, 160 therebetween. In certain examples, long thin strips of the first and second protective layers 112, 162, 122, 172 can be referred to as "tape."

In some implementations, each of the first and second protective layers 112, 122, 162, 172 includes a separate film 114, 124, 164, 174, respectively. Each film 114, 124, 164, 174 carries a respective adhesive layer 116, 126, 166, 176. The optical splice 110, 160 is bonded between the adhesive layers 116, 126, 166, 176 of the first and second films 114, 124, 164, 174. In other implementations, each of the first and second protective layers 112, 122, 162, 172 includes a film 114, 124, 164, 174 that directly bonds to the optical fibers without an intervening adhesive layer.

Each of the optical fibers 102, 104, 152, 154 has a bare fiber section 106, 156 extending outwardly from a coated fiber section 108, 158. The bare fiber section 106, 156 of each optical fiber 102, 104, 152. 154 includes a core and cladding. Ends of the bare fiber sections 106, 156 are spliced together (e.g., fused together) at the splice location. The protective barrier 105, 155 extends over at least a portion of the bare fiber section 106, 156 of each optical fiber 102, 104, 152, 154. In certain implementations, the protective barrier 105, 155 also extends over a portion of the coated section 108, 158 of each optical fiber 102, 104, 152, 154.

The films 114, 124, 164, 174 traverse the splice location. The films 114, 124, 164, 174 are bonded to opposite sides of the bare fibers 106, 156 and/or opposite sides of the coated fiber sections 108, 158 of optical fibers 102, 104, 152, 154 spliced together. In some examples, the adhesive layers 116, 126, 166, 176 carried by the films 114, 124, 164, 174 bond to the optical fibers 102, 104, 152, 154. In certain examples, the adhesive layers 116, 126, 166, 176 bond to the bare fiber sections 106, 156 of the fibers 102, 104, 152, 154. In certain examples, the adhesive layers 116, 126, 166, 176 bond to the coated fiber sections 108, 158 of the fibers 102, 104, 152, 154. In certain examples, the adhesive layers 116, 126, 166, 176 bond to both the bare fiber sections 106, 156 the coated fiber sections 108, 158 of the fibers 102, 104, 152, 154. In certain examples, the adhesive layers 116, 126, 166, 176 also bond to each other at outer extents of the splice location (e.g., at edges of the film that overhang on opposite sides of the optical splice). In other examples, the films 114, 124, 164, 174 bond directly to the optical fibers 102, 104, 152, 154.

In certain implementations, the protective barrier 105, 155 does not include any reinforcing rods or aramid yarns. In certain implementations, the splice arrangement 100, 150 does not include any reinforcing rods or aramid yarns that extend across the splice location.

In certain implementations, the splice arrangement 100, 150 has a thickness less than or equal to 1000 microns, or less than or equal to 900 microns, or less than or equal to 800 microns, or less than or equal to 700 microns, or less than or equal to 600 microns, or less than or equal to 500 microns. In certain implementations, the protective barrier 105, 155 has a thickness less than or equal to 1000 microns, or less than or equal to 900 microns, or less than or equal to 800 microns, or less than or equal to 700 microns, or less than or equal to 600 microns, or less than or equal to 500 microns.

In certain implementations, each film 114, 124, 164, 174 includes a polymeric sheet. In certain implementations, the polymeric sheets 114, 124, 164, 174 each have a thickness in the range of 0.003 to 0.02 inches. In certain implementations, the polymeric sheets 114, 124, 164, 174 each have a thickness less than or equal to 0.02 inches, or less than or equal to 0.01 inches, or less than or equal to 0.005 inches. In certain implementations, the films 114, 124, 164, 174 include Mylar.

In certain implementations, the adhesive in the adhesive layers 116, 126, 166, 176 is heat activated. In some implementations, the adhesive layers 116, 126, 166, 176 bond to the fibers and/or to each other upon the application of a predetermined amount of heat. In other implementations, the adhesive in the adhesive layers 116, 126, 166, 176 is pressure activated. The adhesive layers 116, 126, 166, 176 bond to the fibers and/or to each other upon the application of a predetermined amount of pressure applied to the adhesive layers 116, 126, 166, 176 via the films 114, 124, 164, 174. In still other implementations, the adhesive in the adhesive layers 116, 126, 166, 176 is UV curable. The adhesive layers 116, 126, 166, 176 bond to the fibers and/or to each other when exposed to a predetermined amount of UV light. In yet still other implementations, the adhesive layers 116, 126, 166, 176 are covered in a protective backing that can be peeled off or otherwise removed from the adhesive layers 116, 126, 166, 176 to expose the adhesive. In such implementations, the adhesive layers 116, 126, 166, 176 may bond to the fibers and/or to each other upon contact without added heat, light, or pressure. In certain implementations, no chemicals are needed to activate the adhesive 116, 126, 166, 176.

In some implementations, the adhesive layer 116, 126, 166, 176 varies in thickness over an axial length and/or a lateral width of the protective barrier 105, 155. For example, the adhesive layer 116, 126, 166, 176 may be thicker around the bare fiber sections 106, 156 of the optical fibers 102, 104, 152, 154 than around the coated fiber sections 108, 158 (see FIG. 4). In other implementations, the adhesive layers 116, 126, 166, 176 may have a consistent thickness over the axial length. In still other implementations, one of the adhesive layers 116, 126, 166, 176 may have a different thickness than the other adhesive layer 116, 126, 166, 176.

In some implementations, the protective barrier 105, 155 is sufficiently flexible that the protective barrier 105, 155 does not restrict the flexibility of the optical fibers 102, 104, 152, 154 at the splice location. In certain examples, the first and second protective layers 112, 122, 162, 172 are approximately as flexible as the optical fibers 102, 104, 152, 154. In other implementations, the protective barrier 105, 155 is less flexible than the optical fibers 102, 104, 152, 154, but more flexible than a standard smouv. In an example, the protective barrier 105, 155 has a first flexibility and the optical fibers 102, 104, 152, 154 have a second flexibility that does not vary from the first flexibility by more than 25 percent.

In other implementations, the protective barrier 105, 155 adds rigidity or stiffness to the cable arrangement at the splice location. For example, the protective barrier 105, 155 may be no more than 50% as flexible as the cable arrangement. In certain examples, the protective barrier 105, 155 may less than 55% as flexible as the cable arrangement. In certain examples, the protective barrier 105, 155 may less than 60% as flexible as the cable arrangement. In certain examples, the protective barrier 105, 155 may less than 45% as flexible as the cable arrangement. In certain examples, the protective barrier 105, 155 may between about 1% as flexible as the cable arrangement and 55% as flexible as the cable arrangement. In certain examples, the protective barrier 105, 155 may between about 10% as flexible as the cable arrangement and 50% as flexible as the cable arrangement. In certain examples, the protective barrier 105, 155 may between about 10% as flexible as the cable arrangement and 40% as flexible as the cable arrangement. In certain examples, the protective barrier 105, 155 may between about 20% as flexible as the cable arrangement and 55% as flexible as the cable arrangement. In certain examples, the protective barrier 105, 155 may between about 1% as flexible as the cable arrangement and 20% as flexible as the cable arrangement.

In certain examples, the protective barrier 105, 155 varies in flexibility over an axial length of the protective barrier 105, 155. In certain examples, the protective barrier 105, 155 may be less flexible in regions where the adhesive layers 116, 126, 166, 176 are thicker compared to regions where the adhesive layers 116, 126, 166, 176 are thinner. For example, the adhesive layers 116, 126, 166, 176 may be thicker at areas contacting the bare fiber sections 106, 156 of the optical fibers 102, 104, 152, 154 compared to areas contacting the coated fiber sections 108, 158 of the optical fibers 102, 104, 152, 154. Accordingly, the protective barrier 105, 155 may be more rigid at the splice location compared to the regions around the coated sections 108, 158 of the optical fibers 102, 104, 152, 154.

In certain implementations, the first film 114, 164 has a different flexibility or thickness than the second film 124, 174. In certain implementations, the first adhesive layer 116, 166 has a different flexibility or thickness than the second adhesive layer 126, 176. In certain implementations, the first film 114, 164 and the second film 124, 174 have the same thickness and flexibility. In certain implementations, the first adhesive layer 116, 166 and the second adhesive layer 126, 176 have the same thickness and flexibility.

Figure 8A:
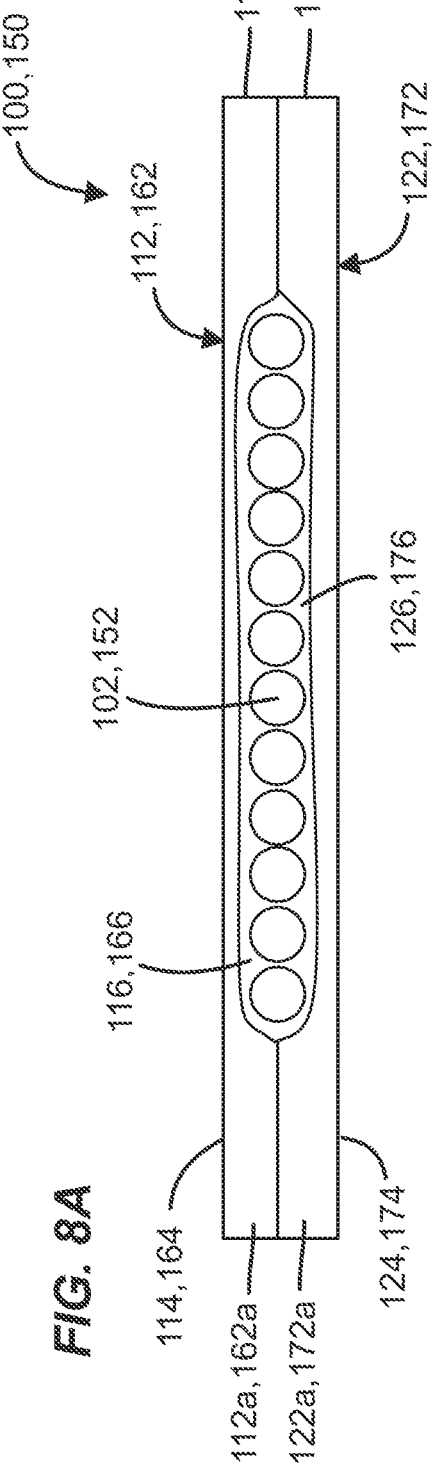
FIG. 8A is an end view taken along the 8-8 line of a first example implementation of the cable arrangement of FIGS. 6 and 7 with the cross-hatching omitted for ease in viewing.
Figure 8B:
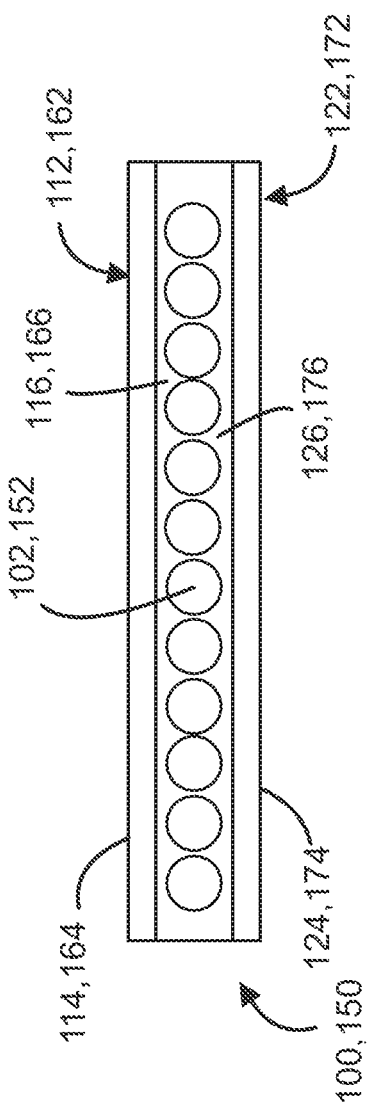
FIG. 8B is an end view taken along the 8-8 line of a second example implementation of the cable arrangement of FIGS. 6 and 7 with the cross-hatching omitted for ease in viewing, where

In some implementations, the optical splice 110 is between only the first and second optical fibers 102, 104 (see FIGS. 4 and 5). In certain implementations, the films 114, 124 are wider than the first and second optical fibers 102, 104. In some such implementations, the first and second protective layers 112, 122 may adhesively bond to each other at longitudinal edges 112a, 122a, 112b, 122b on opposite sides of the first and second fibers 102, 104 (e.g., see FIG. 8A). In other examples, the first and second protective layers 112, 122 bond only to the fibers 102, 104 (e.g., see FIG. 8B). In some examples, the protective layers 112, 122 are manufactured to extend beyond the fibers by a predetermined margin. In other examples, the protective layers 112, 122 can be trimmed to a desired size after the protective barrier is installed over the splice.

Figure 6:
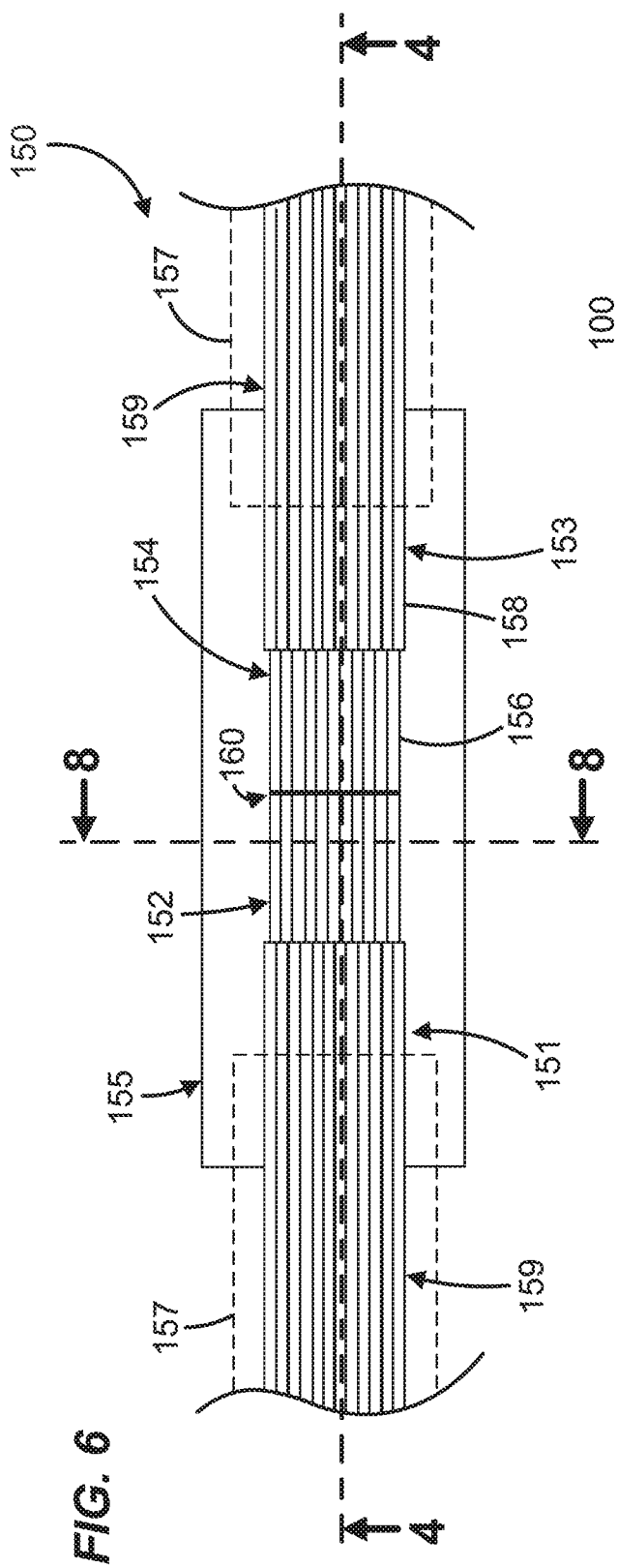
FIG. 6 is a schematic top plan view of the protective barrier of FIG. 4 over another example splice between first and second loose fiber ribbons in accordance with other principles of the present disclosure, the protective barrier being shown as clear for ease in viewing the splice.
Figure 7:
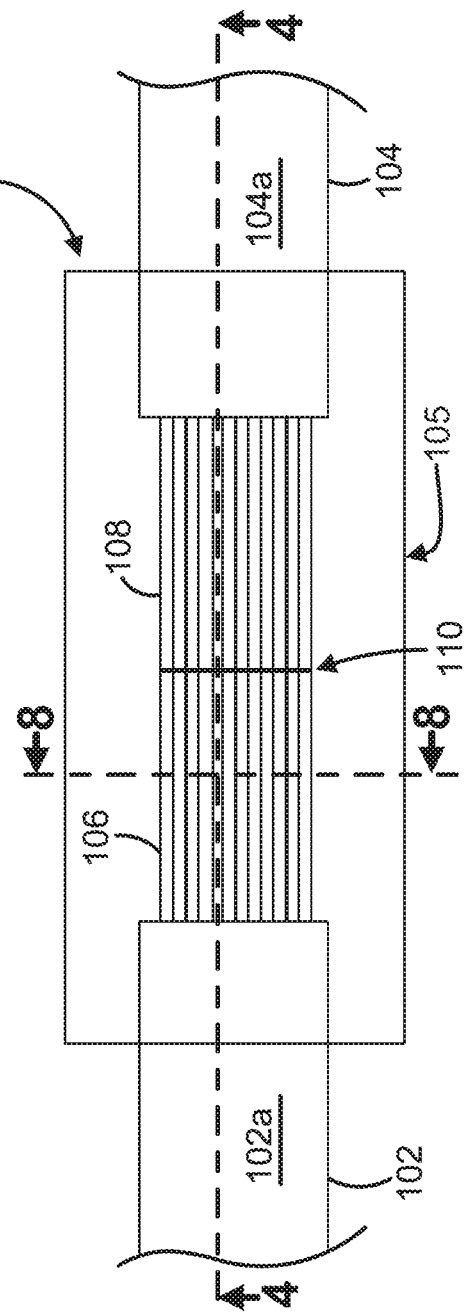
FIG. 7 is a schematic top plan view of an example cable arrangement including a first ribbonized cable section spliced to a second ribbonized cable section at a splice location, the splice location being protected by the protective barrier of FIG. 4, for example a Mylar substrate arrangement.

In other implementations, the optical splice 160 is between a first set 151 of optical fibers 152 and a second set 153 of optical fibers 154 (see FIGS. 6-8). For example, the optical splice 160 may be a mass fusion splice. In some examples, the optical fibers 152, 154 of each of the first and second sets 151, 153 are loose relative to each other (i.e., not attached to each other). In other examples, the optical fibers 152, 154 of each set 151, 153 are ribbonized together to form fiber ribbons 157. An example ribbon 157 includes a ribbonized portion where the optical fibers 152, 154 (e.g., coated sections 158 of the fibers) are coated or otherwise encased with a matrix material. The first and second protective layers 162, 172 are bonded (e.g., adhesively bonded) to the ribbonized portions.

In still other examples, the optical fibers 152, 154 of each set 151, 153 are structured to form loose ribbons 159. As the term is used herein, a "loose ribbon" 159 refers to a set 151, 153 of fibers 152, 154 that are loosely coupled together at various intervals along their length. Examples of loose ribbons 159 are disclosed in U.S. Publication Nos. 2014/0112631, 2017/0235068, and 2017/0031121, the disclosures of which are hereby incorporated herein by reference. Other examples of loose ribbons 159 of fibers 152, 154 include the Rollable Ribbons™ produced by OFS Furukawa of Norcross, Ga., the Spiderweb® Ribbon produced by AFL Telecommunications, LLC of Duncan, S.C., and the RocketRibbon® produced by Corning Optical Communications LLC of Hickory, N.C.

In certain implementations, at least the bare sections 156 of each set 151, 153 of fibers 152, 154 are arranged in a row. In certain examples, at least portions of the coated sections 158 of the fibers 152, 154 also form the rows. In some implementations, the coated sections 158 of the fibers 152, 154 are loose relative to each other. In other implementations, at least some portions of the coated sections 158 of the fibers 152, 154 are attached to each other (e.g., at intervals along the lengths of the fibers).

Each row has a first major side and an opposite second major side that extend across the fibers 152, 154 in the row. The first protective layer 162 is applied to the first major side of each row and the second protective layer 164 is applied to the second major side of each row. In particular, the adhesive layers 166, 176 of the protective layers 162, 172 extend across the optical fibers 152, 154 in the fiber rows.

In certain implementations, the protective layers 162, 172 are wider than the rows of the optical fibers 152, 154. The first and second protective layers 162, 172 are adhesively bonded to each other at longitudinal edges 162a, 172a, 162b, 172b on opposite sides of the rows (e.g., see FIG. 8A). In other examples, the first and second protective layers 162, 172 bond only to the fibers 152, 154 (e.g., see FIG. 8B). In some examples, the protective layers 162, 172 are manufactured to extend beyond the fibers by a predetermined margin. In other examples, the protective layers 162, 172 can be trimmed to a desired size after the protective barrier is installed over the splice.

Figure 9:
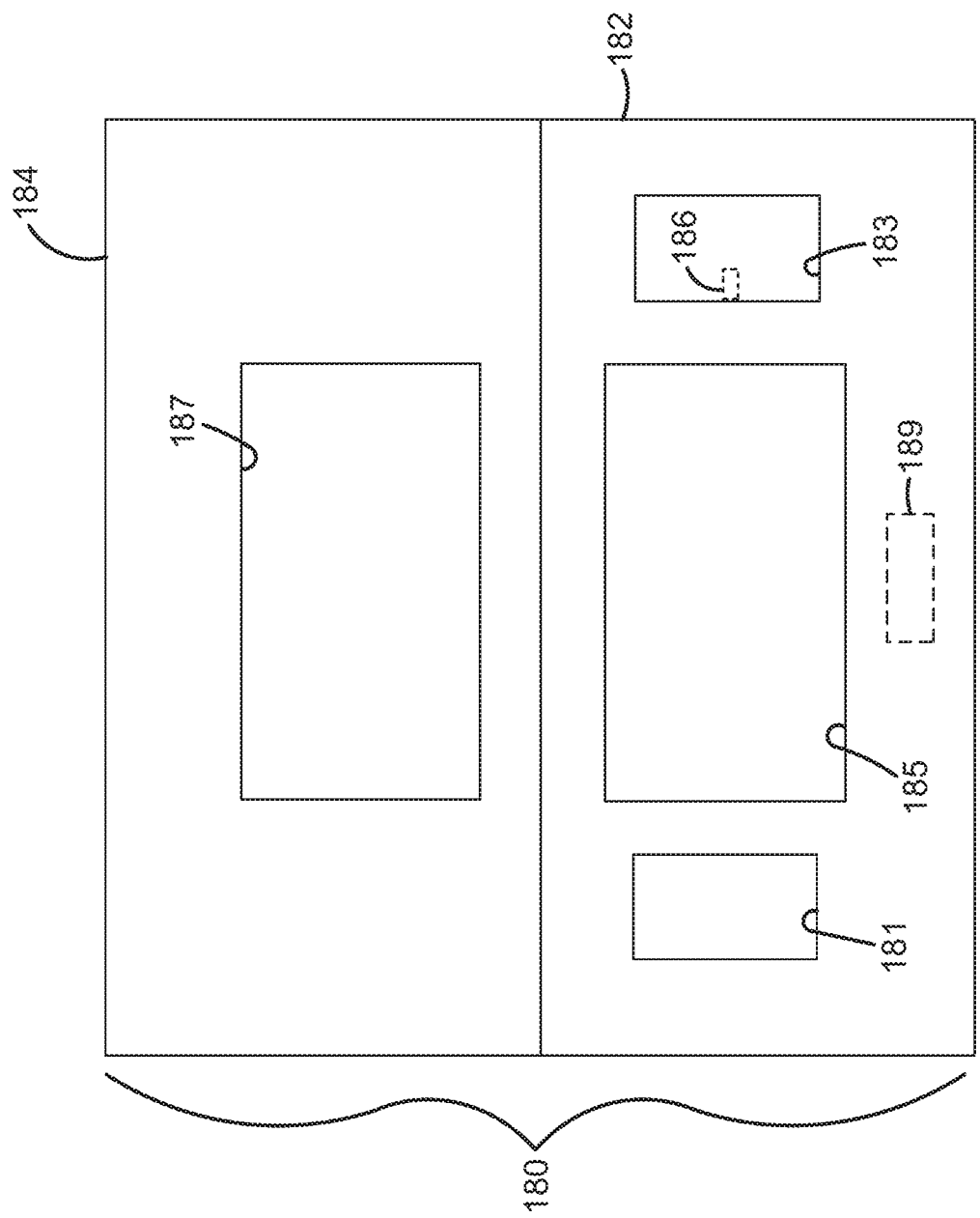
FIG. 9 is a schematic view of an example tool for use in applying the protective barrier to an optical splice.
Figure 10:
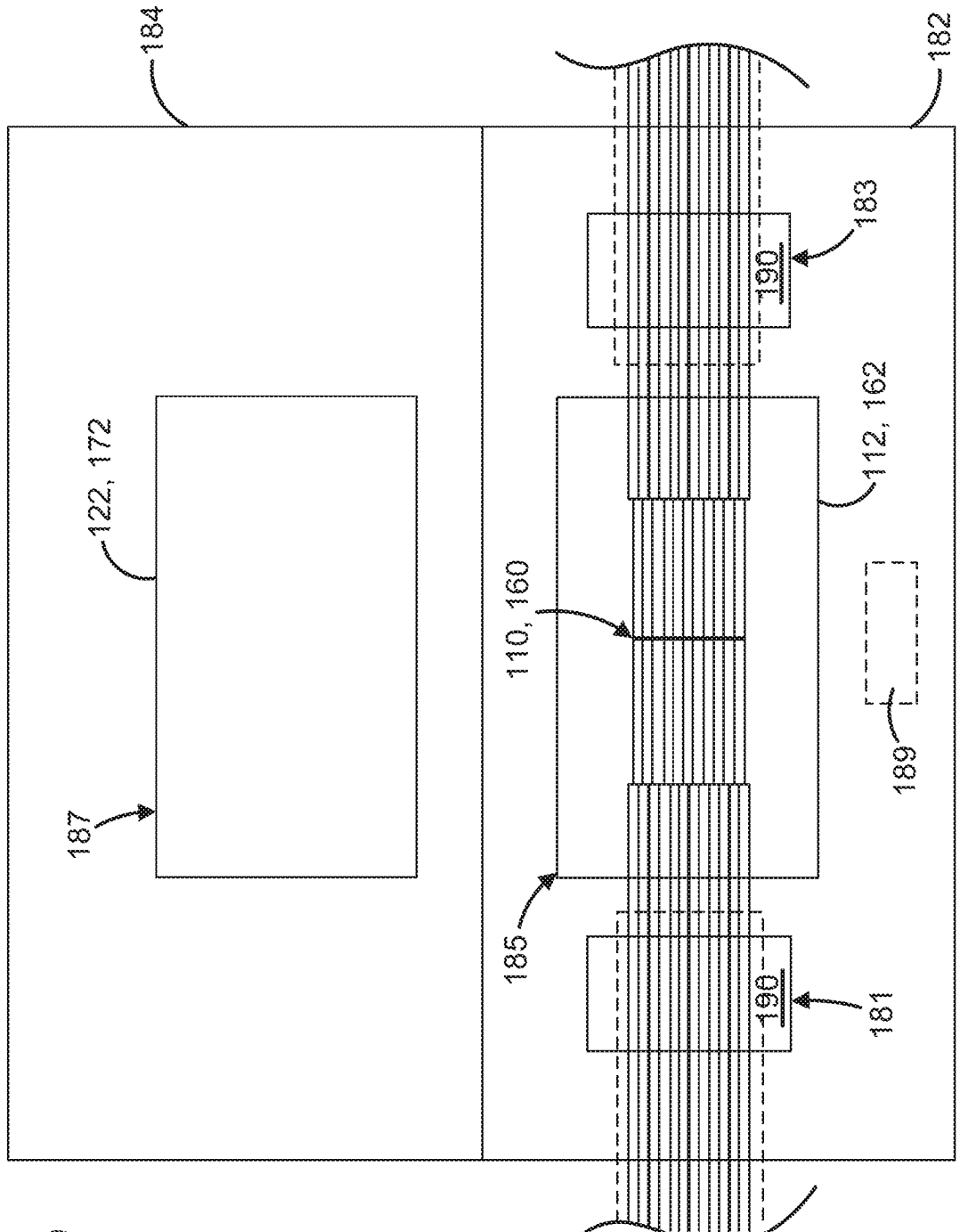
FIG. 10 is a schematic view showing an example splice mounted at the tool of FIG. 9.

Referring to FIGS. 9 and 10, a tool 180 can be used to install the protective barrier 105, 155 over an optical splice 110 between at least first and second optical fibers 102, 104, 152, 154. The tool 180 registers the first and second protective layers 112, 122, 162, 172 relative to each other and relative to the optical splice 110, 160. The tool 180 also may apply the protective layers 112, 122, 162, 172 over the optical splice 110, 160 and retain the protective layers 112, 122, 162, 172 in contact with the optical fibers 102, 104, 152, 154 until the protective barrier 105, 155 is formed. In certain examples, the tool 180 is configured to activate the adhesive of the protective layers 112, 122, 162, 172.

The tool 180 for installing a protective barrier 105, 155 over an optical splice 110, 160 includes a first part 182 and a second part 184. The tool 180 is configured to receive pre-spliced optical fibers 102, 104, 152, 154 (i.e., optical fibers that have already been spliced together). The tool 180 applies the first and second protective layers 112, 122, 162, 172 around the optical splice 110, 160. For example, the tool 180 may receive the optical splice 110, 160 with the first part 182 and may receive a protective layer 122, 172 with the second part 184. In certain examples, the first part 182 also may receive one of the protective layers 112, 162. In other examples, the first part 182 receives the first protective layer 112, 162, the optical splice 110, 160 positioned over the first protective layer 112, 162, and the second protective layer 122, 172 positioned over the optical splice 110, 160 in alignment with the first protective layer 112, 162.

In certain examples, the tool 180 aligns the optical splice 110, 160 with a central region of the protective layers 112, 122, 162, 172. In certain examples, the tool 180 aligns the first and second films 114, 164, 124, 174 with each other at opposite sides of the optical splice 110, 160. In certain examples, the tool 180 is configured to move the protective layers 112, 122, 162, 172 closer together until the adhesive layers 116, 126, 166, 176 engage the optical fibers 102, 104, 152, 154. In certain examples, the tool 180 is configured to move the protective layers 112, 122, 162, 172 closer together until the adhesive layers 116, 126, 166, 176 engage each other. In certain examples, the tool 180 is configured to mechanically press the protective layers 112, 122, 162. 172 together.

In certain implementations, the optical fibers 102, 104, 152, 154 are received at mechanical holders 190 that can be mounted at the tool 180. A first mechanical holder 190 retains the optical fiber(s) 102, 152 at one side of the optical splice 110, 160 and a second mechanical holder 190 retains the optical fiber(s) 104, 154 at the other side of the splice 110, 160. In certain implementations, the mechanical holders 190 are removable from the tool 180. In certain examples, the mechanical holders 190 are carried with the optical fibers 102, 104, 152, 154.

In certain implementations, the mechanical holder 190 clamps the optical fiber(s). In some examples, the mechanical holder 190 retains the bare sections 106, 156 of the optical fiber(s) 102, 104, 152, 154. In other examples, the mechanical holder 190 retains the coated sections 108, 158 of the optical fiber(s) 102, 104, 152, 154. In still other examples, the mechanical holder 190 retains a ribbonized section 157, 159 of the optical fiber(s) 152, 154.

In certain examples, the mechanical holders 190 facilitate mounting the optical fibers 102, 104, 152, 154 at a separate splice tool at which the optical splice 110, 160 is formed. For example, the mechanical holders 190 can be installed over the respective optical fibers 102, 104, 152, 154 before the fibers are spliced together. In fact, the mechanical holders 190 can be mounted to the fibers 102, 104, 152, 154 in preparation for preparing the fibers for splicing. For example, a holder 190 retaining one or more fibers can be first mounted to a stripping machine (or otherwise used to mount the fiber(s) at a known location relative to the stripping machine) to hold the fiber(s) in position while a coating is removed from the fiber(s). The holder 190 can be moved to a splicing machine (or to a known location relative to the splicing machine) to hold the fiber(s) in position while the fiber(s) are spliced to a corresponding one or more fibers. The holder 190 can then be moved to the tool 180 for applying the protective barrier 155. In examples, the holder 190 can be positioned at or near cleaning devices to clean the optical fiber(s) between the stripping, splicing, and/or barrier applying steps.

The first part 182 of the tool 180 defines a first holder mounting location 181 configured to receive the first mechanical holder 190, a second holder mounting location 183 configured to receive the second mechanical holder 190, and a first film mounting location 185 disposed between the first and second holder mounting locations 181, 183.

In certain implementations, when the holders 190 are disposed at the respective holder mounting locations 181, 183, the optical splice 110, 160 is held at a known position on the tool 180. In certain implementations, when the holders 190 are disposed at the respective holder mounting locations 181, 183, the optical splice 110, 160 is held above the first film mounting location 185.

In certain implementations, each of the holder mounting locations 181, 183 may define pockets in which the mechanical holders 190 may seat. In certain examples, the mechanical holders 190 can be secured (e.g., latched, fasteners, snap-fit, friction-fit, etc.) at the holder mounting locations 181, 183. In certain examples, the optical splice 110, 160 is tensioned when the holders 190 are mounted at the respective holder mounting locations 181, 183. In some cases, tensioning the optical splice 110, 160 may straighten the optical fibers 102, 104, 152, 154 between the mechanical holders 190. In an example, the holder mounting locations 181, 183 are spaced sufficiently far apart to tension the optical splice 110, 160. In another example, at least one of the holder mounting locations 181, 183 includes a biasing member (e.g. a spring) 186 that biases the respective holder 190 away from the other holder 190, thereby tensioning the optical splice 110, 160. For example, a biasing member 186 may be disposed within a pocket at the second holder mounting location 183 to bias any holder 190 mounted within the pocket away from the first holder mounting location 181.

In some implementations, the second part 184 of the tool 180 defines a second film mounting location 187. Each of the film mounting locations 185, 187 is configured to hold one of the protective layers 112, 122, 162, 172. For example, the protective layers 112, 162, 122, 172 may be friction-fit, vacuum-fit, clamped, latched, or otherwise held at the film mounting locations 185, 187. In certain examples, at least the second film mounting location 187 secures the protective layer 122, 172 sufficient to move the second part 184 of the tool 180 without dislodging the second protective layer 122, 172. In other implementations, the second part 184 merely includes structure to press together protective layers 112, 122, 162, 172 held by the first part 182 around the splice 110, 160.

The second part 184 is movable relative to the first part 182 between a first (e.g., open) position and a second (e.g., closed) position. In some examples, the second part 184 is pivotal relative to the first part 182. In other examples, the second part 184 is slidable (i.e., movable in a straight, non-pivoting motion) relative to the first part 182. In still other examples, the second part 184 is freely movable relative to the first part 182 (e.g., is a separate piece from the first part). When in the first position, the first and second parts 182, 184 are arranged to facilitate mounting of the mechanical holders 190 at the holder mounting locations 181, 183. The protective layers 112, 122, 162, 172 also can be mounted at the film mounting locations 185, 187 when the first and second parts 182, 184 are disposed in the first position.

The first protective layer 112, 162 is applied to the second protective layer 122, 172 when the first and second parts 182, 184 of the tool 180 are disposed in the second position. In certain examples, the second film mounting location 187 opposes the first film mounting location 185 at least when the second part 184 of the tool 180 is disposed in the first position. The first and second film mounting locations 185, 187 are located farther apart from each other when the second part 184 is disposed in the first position compared to the second position.

In certain implementations, the tool 180 includes an activator (shown schematically at 189) configured to activate the adhesive of the protective layers 112, 122, 162, 172. In some examples, the activator 189 includes a heater that applies heat to the adhesive layers 116, 126, 166, 176 to melt or otherwise cause the adhesive layers to engage each other. In other examples, the activator 189 includes an emitter that emits UV light in a direction towards the adhesive layers 166, 176 when the adhesive layers 116, 126, 166, 176 are engaged together.

In still other examples, the activator 189 includes one or more pressure members that apply pressure across the protective layers 112, 122, 162, 172 to press the adhesive layer 116, 166 of the first protective layer 112, 162 against the adhesive layer 126, 176 of the second protective layer 122, 172. In certain examples, the first and second parts 182, 184 are designed so that moving the second part 184 to the second position automatically applies sufficient pressure around the protective layers to activate the adhesive. In certain examples, the film mounting locations 185, 187 are movable towards each other to apply press the protective layers 112, 162, 122, 172 together.

The protective barrier 105, 155 is sized and configured to allow the splice arrangement 100, 150 to be utilized in various applications. In an example, the protective barrier 105, 155 is sized and configured to enable the splice arrangement 100, 150 to be located within a connector body of a fiber optic connector. In an example, the protective barrier 105, 155 is sized and configured to enable the splice arrangement 100, 150 to be located just outside of a fiber optic connector. In an example, the protective barrier 105, 155 is sized and configured to enable the splice arrangement 100, 150 to be located within a splice tray. In an example, the protective barrier 105, 155 is sized and configured to enable the splice arrangement 100 to be located within a cable (e.g., within a buffer tube and/or strength layer and/or cable jacket). In an example, the protective barrier 105, 155 is sized and configured to enable the splice arrangement 100, 150 to be located within a sealed reinforcing element (e.g., an overmolded shroud, or other protective casing). In an example, the protective barrier 105, 155 is sized and configured to enable the splice arrangement 100, 150 to be located within a larger enclosure (e.g., a multi-service terminal or other enclosure holding components other than the optical splice arrangement). In certain implementations, the splice arrangement 100, 150 can be used in panels, devices, modules, cable assemblies, break-outs and cable transitions.

In certain implementations, the configuration of the protective barrier is flexible. Accordingly, a protective barrier can be customized for a particular application by varying the film composition and/or the film thickness. For example, a protective barrier having a first degree of flexibility may be used within a rigid closure and a protective barrier having a second, different degree of flexibility may be used along a cable (i.e., under the cable jacket).

In use, a protective barrier is installed about an optical splice by positioning the optical splice between a first adhesive layer carried by a first film and a second adhesive layer carried by a second film; moving the first and second films towards each other until the adhesive layers engage around the optical splice; and activating the adhesive layers of the first and second films.

In some examples, the optical splice is a splice between a first single optical fiber and a second single optical fiber. In other examples, the optical splice is a splice between a first plurality of optical fibers and a second plurality of optical fibers. For example, the optical splice may be a mass fusion splice.

In certain implementations, the spliced optical fibers are positioned on a tool that applies the protective barrier. In certain examples, the spliced optical fibers are positioned on the tool using mechanical holders (e.g., fiber clamps). In examples, the optical fibers are positioned on the tool so as to put tension on the optical splice. For example, one or both mechanical holders may be spring-biased away from the other mechanical holder.

In some implementations, the adhesive layers 116, 126, 166, 176 are activated before moving the first and second films 114, 124, 164, 174 towards each other. For example, a protective backing may be removed from the adhesive layers 116, 126, 166, 176 before moving the films 114, 124, 164, 174 towards each other.

In other implementations, the adhesive layers 116, 126, 166, 176 are activated after the first and second films 114, 124, 164, 174 have been moved towards each other. For example, the adhesive layers 116, 126, 166, 176 may be activated when the adhesive layers are in contact with each other. In some examples, the adhesive layers 116, 126, 166, 176 are activated by applying heat. In other examples, the adhesive layers 116, 126, 166, 176 are activated by applying pressure. In other examples, the adhesive layers 116, 126, 166, 176 are activated by applying UV light.

In certain implementations, the first and second films 114, 124, 164, 174 are moved towards each other by moving the first and second parts 182, 184 of the tool 180 towards each other. In an example, one or both of the first and second parts 182, 184 may be pivoted towards the other. In another example, one or both of the first and second parts 182, 184 may be slid towards the other. In another example, the first and second parts 182, 184 are separable from each other and, therefore, freely movable relative to each other.

In certain implementations, the protective layers 112, 122, 162, 172 are configured to indicate a proper orientation to the technician applying the protective layers 112, 122, 162, 172 to form the protective barrier 105, 155 about the splice 110, 160. In certain examples, the protective layers 112, 122, 162, 172 are configured to facilitate distinguishing the adhesive side of the protective layer 112, 122, 162, 172 from the non-adhesive side. In certain examples, the adhesive side and non-adhesive side have different colors. In certain examples, the adhesive side and non-adhesive side have different textures (e.g., glossy versus matte, smooth versus textured, etc.). In still other implementations, each protective layer 112, 122, 162, 172 may be cut (e.g., notched at a pre-determined corner) to distinguish the adhesive side from the non-adhesive side.

In certain implementations, indicia (e.g., inked indicia) are carried by the protective layers 112, 122, 162, 172 to distinguish the adhesive and non-adhesive sides. In certain examples, the indicia is deposited or otherwise disposed between the film 114, 124, 164, 174 and the adhesive layer 116, 126, 166, 176 of each protective layer 112, 122, 162, 172. In some example, the indicia include text. In other examples, the indicia includes pictures or one or more blocks of color.

Figure 11:
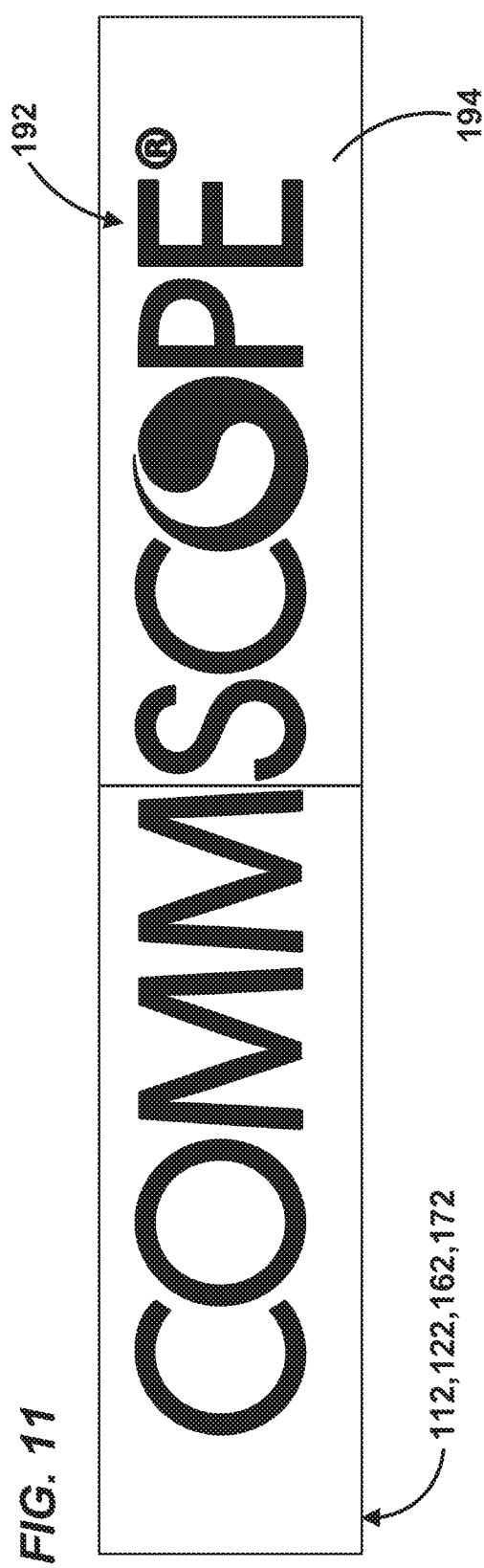
FIG. 11 is a plan view of a non-adhesive side of an example protective layer.
Figure 12:
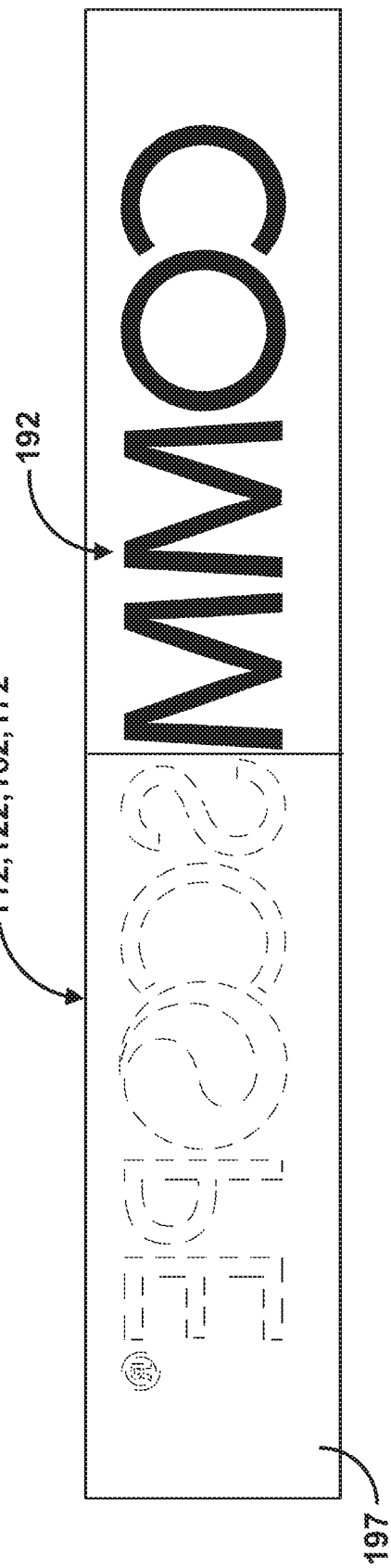
FIG. 12 is a plan view of an adhesive side of the example protective layer of FIG. 11.

FIGS. 11 and 12 illustrate a protective layer 112, 122, 162, 172 including example indicia 192. In the example shown, the indicia 192 includes text. In an example, the text 192 extends over a majority of the protective layer 112, 122, 162, 172. In an example, the protective layer 112, 122, 162, 172 is elongate along a length and the text spans a majority of the length. In other examples, the text 192 may span less than half of the length protective layer 112, 122, 163, 172. In an example, a height of the letters of the text span a majority of a width of the protective layer 112, 122, 162, 172. In other examples, the text 192 may span less than half of the width of the protective layer 112, 122, 163, 172. In certain examples, the text is correctly oriented when the protective layer 112, 122, 162, 172 is arranged adhesive side down.

A technician applying a protective barrier 105, 155 about a splice 110, 160 would position (e.g., using the tool 180) a first one of the protective layers 112, 122, 162, 172 so that the text 192 was either upside-down or reversed (i.e., reading right-to-left) below the splice 110, 160. The technician would then position a second one of the protective layers 112, 122, 162, 172 so that the text 192 was right-side up and reading left-to-right above the splice 110, 160. The technician would then bring the first and second protective layers 112, 122, 162, 172 together (e.g., using the tool 180) to sandwich the splice 110, 160 therebetween. In some examples, the technician would then apply heat to active the adhesive sides of the protective layers to secure the protective layers about the splice 110, 160. In other examples, the technician would remove blank films to uncover the adhesive side prior to bringing the adhesive sides (e.g., pressure-activated adhesive sides) together.

In certain implementations, each protective layer 112, 122, 162, 172 can include multiple types of indicia to facilitate properly orienting the protective layer. In certain examples, an opaque coloring (e.g., white, black, gray, red, blue, green, etc.) 194 can form a background for the text 192. In certain examples, the opaque coloring 194 may extend over only a portion of the protective layer 112, 122, 162, 172. A remainder of the background may be transparent, allowing the technician to see through the protective layer 112, 122, 162, 172. In an example, the opaque coloring 194 overlaps a portion of the text 192.

In certain examples, the coloring 194 is sufficient to at least partially block visibility of the text 192 when viewed from the adhesive side of the protective layer 112, 122, 162, 172 while not obscuring the text when viewed from the non-adhesive side. In an example, the coloring 194 fully blocks visibility of the overlapping text when viewed from the adhesive side. In some implementations, a technician can properly position the first and second protective layers 112, 122, 162, 172 by aligning the opaque coloring of the two layers one above the other. In other implementations, a technician can properly position the first and second protective layers 112, 122, 162, 172 by offsetting the opaque coloring of the two layers. Accordingly, the protective barrier 105, 155 is assembled so that portions of the fibers and splice 110, 160 are visible along a full length of the protective barrier 105, 155. For example, a top portion of the fibers and splice 110, 160 may be visible at one (e.g., left) side of the protective barrier 105, 155 and a bottom portion of the fibers and splice 110, 160 may be visible at the other (e.g., right) side of the protective barrier 105, 155.

ASPECTS OF THE DISCLOSURE

Aspect 1. A splice arrangement comprising a protective barrier disposed across an optical splice between at least two optical fibers, the protective barrier including first and second protective layers that are each separately bonded to portions of the optical fibers.

Aspect 2. The splice arrangement of aspect 1, wherein each protective layer is adhesively bonded to the optical fibers.

Aspect 3. The splice arrangement of any of aspects 1 and 2, wherein each protective layer is bonded to bare fiber sections of the optical fibers.

Aspect 4. The splice arrangement of any of aspects 1-3, wherein each protective layer is bonded to coated fiber sections of the optical fibers.

Aspect 5. The splice arrangement of any of aspects 1-4, wherein the first and second protective layers are bonded to each other at portions of a periphery of the optical splice.

Aspect 6. The splice arrangement of any of aspects 1-5, wherein each protective layer includes a film carrying a layer of adhesive.

Aspect 7. The splice arrangement of any of aspects 1-6, wherein the at least two optical fibers include a first single optical fiber and a second single optical fiber spliced together at the splice location.

Aspect 8. The splice arrangement of any of aspects 1-6, wherein the at least two optical fibers include a first plurality of optical fibers and a second plurality of optical fibers spliced to each other at the splice location.

Aspect 9. The splice arrangement of aspect 8, wherein the first and second plurality of optical fibers are each ribbonized.

Aspect 10. The splice arrangement of aspect 8, wherein the first and second plurality of optical fibers are each loosely ribbonized.

Aspect 11. The splice arrangement of aspect 8, wherein the first and second plurality of optical fibers are each fully loose relative to each other.

Aspect 12. The splice arrangement of any of aspects 2-11, wherein the adhesive is heat activated.

Aspect 13. The splice arrangement of any of aspects 2-11, wherein the adhesive is pressure activated.

Aspect 14. The splice arrangement of any of aspects 2-11, wherein the adhesive is UV curable.

Aspect 15. The splice arrangement of any of aspects 6-11, wherein each protective layer includes a peelable protective backing at an opposite side of the adhesive layer from the film.

Aspect 16. The splice arrangement of any of aspects 6-12, wherein each film includes a polymeric sheet.

Aspect 17. The splice arrangement of any of aspects 1-16, wherein the protective barrier does not restrict the flexibility of the optical fibers at the splice location.

Aspect 18. The splice arrangement of any of aspects 1-16, wherein the protective barrier is not more than 55% as flexible as the cable arrangement.

Aspect 19. The splice arrangement of any of aspects 2-18, wherein the adhesive of the protective barrier varies in thickness over an axial length of the protective barrier, the axial length extending along the at least two optical fibers and through the splice location.

Aspect 20. The splice arrangement of any of aspects 1-19, wherein the protective barrier varies in thickness over an axial length of the protective barrier, the axial length extending along the at least two optical fibers and through the splice location.

Aspect 21. The splice arrangement of any of aspects 1-20, wherein the protective barrier varies in flexibility over an axial length of the protective barrier, the axial length extending along the at least two optical fibers and through the splice location.

Aspect 22. The splice arrangement of any of aspects 6-21, wherein the first film has a different flexibility or thickness than the second film.

Aspect 23. The splice arrangement of any of aspects 1-22, wherein the protective barrier was installed using a tool.

Aspect 24. The tool of aspect 23, wherein the tool includes a first part that holds the optical splice and a second part that holds one of the protective layers, the first part being movable towards the second part to apply the protective layer to the optical splice.

Aspect 25. The tool of aspect 24, wherein the first part of the tool also holds the other of the protective layers in registration with the optical splice and/or with the protective layer held by the second part of the tool.

Aspect 26. The tool of any of aspects 23-25, wherein holders are installed around the optical fibers to hold the optical fibers to the tool.

Aspect 27. The tool of any of aspects 23-26, wherein the tool is configured to tension the optical splice as the protective layer is being applied across the optical splice.

Aspect 28. The tool of any of aspects 23-27, wherein the tool also applies a second protective layer across the optical splice opposite from the Aspect 29. A tool for installing a protective barrier across an optical splice to form a splice arrangement, such as the splice arrangement of any of aspects 1-23, the optical splice being between at least first and second optical fibers, each of the first and second optical fibers being held by a respective holders, the tool comprising:
 a first part defining a first holder mounting location configured to receive the holder of the first optical fiber and a second holder mounting location configured to receive the holder of the second optical fiber to position the optical splice at a known location; and
 a second part movable relative to the first part between a first position and a second position, wherein the tool applies a protective layer to the optical splice when the second part is moved to the second position.

Aspect 30. The tool of aspect 29, wherein the second part defines a film mounting location at which a protective layer can be held, the second part aligning the protective layer held at the film mounting location with the optical splice when the second part is disposed in the second position.

Aspect 31. The tool of any of aspects 29 and 30, wherein the first part defines a film mounting location at which a protective layer can be held, the first part aligning the protective layer held at the film mounting location with the optical splice.

Aspect 32. The tool of any of aspects 29-31, wherein the second part pivots between the first and second positions.

Aspect 33. The tool of any of aspects 29-31, wherein the second part slides between the first and second positions.

Aspect 34. The tool of any of aspects 29-31, wherein the second part is freely movable between the first and second positions.

Aspect 35. The tool of any of aspects 29-34, wherein at least one of the first and second holder mounting locations is configured to bias the respective holder received thereat away from the other of the first and second holder mounting locations to tension the optical splice.

Aspect 36. The tool of aspect 35, wherein the tool includes a biasing member configured to tension the optical splice.

Aspect 37. The tool of aspect 36, wherein the biasing member is disposed one of the holder mounting locations.

Aspect 38. The tool of any of aspects 29-37, wherein the tool is configured to activate an adhesive layer of the protective layer.

Aspect 39. The tool of aspect 38, wherein the tool includes a heater to heat the adhesive layer.

Aspect 40. The tool of aspect 38, wherein the tool includes a pressure application arrangement to apply pressure to the adhesive layer.

Aspect 41. The tool of aspect 38, wherein the tool includes an emitter to emit UV light at the adhesive layer.

Aspect 42. A method for installing a protective barrier across an optical splice between at least a first optical fiber and a second optical fiber, the method comprising:
 aligning a protective layer with the optical splice so that the protective layer spans the optical splice and extends from the optical splice along portions of the first and second optical fibers; and
 moving the protective layer into contact with the portions of first and second optical fibers.

Aspect 43. The method of aspect 42, further comprising adhesively bonding the protective layer to the first and second optical fibers.

Aspect 44. The method of aspect 43, wherein the protective layer includes a film carrying an adhesive layer, and wherein the method further comprises activating the adhesive layer.

Aspect 45. The method of aspect 44, wherein activating the adhesive layer includes heating the adhesive layer.

Aspect 46. The method of aspect 44, wherein activating the adhesive layer includes applying pressure to press the adhesive layer against the first and second optical fibers.

Aspect 47. The method of aspect 44, wherein activating the adhesive layer includes emitting UV light at the adhesive layer.

Aspect 48. The method of any of aspects 42-47, wherein the protective layer is a first protective layer; and wherein the method further comprises aligning a second protective layer at an opposite side of the optical splice from the first protective layer; and moving the second protective layer into contact with the first and second optical fibers.

Aspect 49. The method of aspect 48, wherein each protective layer only bonds to the first and second optical fibers and/or the optical splice.

Aspect 50. The method of aspect 48, wherein the first and second protective layers bond to each other at outer extends of the optical splice.

Aspect 51. The method of any of aspects 42-50, wherein the aligning and moving steps are performed using a tool.

Aspect 52. The method of any of aspects 48-51, wherein each of the first and second protective layers includes an adhesive side and a non-adhesive side, and wherein aligning the first protective layer and aligning the second protective layer comprises aligning the first and second protective layers so that the adhesive sides face each other.

Aspect 53. The method of aspect 52, wherein the first and second protective layer include text indicia properly readable when viewed from the non-adhesive side.

Aspect 54. The method of aspect 52, wherein the first and second protective layer include opaque coloring indicia extending over only a portion of the respective protective layer.

Aspect 55. The method of aspect 54, wherein aligning the first and second protective layers so that the adhesive sides face each other comprises offsetting the opaque coloring of the first and second protective layers.

Aspect 56. The method of aspect 52, wherein the first and second protective layer include a notch at a predetermined location.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A splice arrangement comprising:
   optical fibers that are fusion spliced together at a splice location; and
   a protective barrier disposed across the splice location, the protective barrier including first and second films, each of the first and second films carrying a respective adhesive layer, the splice location being bonded between the adhesive layers of the first and second films, wherein the first and second films include text indicia properly readable when viewed from non-adhesive sides of the first and second films, wherein aligning the first and second films includes aligning the text indicia to face in different directions.

2. The splice arrangement of claim 1, wherein the optical fibers include a first single optical fiber and a second single optical fiber spliced together at the splice location.

3. The splice arrangement of claim 2, wherein the optical fibers includes a first plurality of optical fibers spliced to a second plurality of optical fibers at the splice location.

4. The splice arrangement of claim 3, wherein the first and second plurality of optical fibers are each ribbonized.

5. The splice arrangement of claim 3, wherein the first and second plurality of optical fibers are each loosely ribbonized.

6. The splice arrangement of claim 3, wherein the first and second plurality of optical fibers are each fully loose relative to each other.

7. The splice arrangement of claim 1, wherein the adhesive is heat activated.

8. The splice arrangement of claim 1, wherein the adhesive is pressure activated.

9. The splice arrangement of claim 1, wherein the adhesive is UV curable.

10. The splice arrangement of claim 1, wherein each film includes a flexible polymeric sheet.

11. The splice arrangement of claim 1, wherein the protective barrier restricts the flexibility of the optical fibers at the splice location by at least 50%.

12. The splice arrangement of claim 1, wherein the protective barrier varies in thickness over an axial length of the protective barrier.

13. The splice arrangement of claim 1, wherein the protective barrier varies in flexibility over an axial length of the protective barrier.

14. The splice arrangement of claim 1, wherein the first film has a different flexibility or thickness than the second film.

15. The splice arrangement of claim 1, wherein each of the first and second films include opaque coloring indicia extending over only a portion of a respective polymeric sheet.

16. The splice arrangement of claim 15, wherein aligning the first and second films includes offsetting the opaque coloring of the polymeric sheets.

17. The splice arrangement of claim 1, wherein each of the first and second films includes a notch at a predetermined location.

* * * * *